(12) United States Patent
Ranlett

(10) Patent No.: US 7,219,263 B1
(45) Date of Patent: May 15, 2007

(54) METHOD AND SYSTEM FOR MINIMIZING MEMORY CORRUPTION

(75) Inventor: James A. Ranlett, Roseville, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 651 days.

(21) Appl. No.: 10/696,471

(22) Filed: Oct. 29, 2003

(51) Int. Cl.
*G06F 11/00* (2006.01)

(52) U.S. Cl. .................. 714/22; 365/206; 365/226; 365/228

(58) Field of Classification Search ............. None
See application file for complete search history.

(56) References Cited

U.S. PATENT DOCUMENTS

| | | | |
|---|---|---|---|
| 4,268,906 A | 5/1981 | Bourke et al. | |
| 4,333,143 A | 6/1982 | Calder | |
| 4,449,182 A | 5/1984 | Rubinson | |
| 4,534,018 A * | 8/1985 | Eckert et al. ............. | 365/228 |
| 4,549,263 A | 10/1985 | Calder | |
| 4,777,595 A | 10/1988 | Strecker et al. | |
| 4,783,730 A | 11/1988 | Fischer | |
| 4,783,739 A | 11/1988 | Calder | |
| 4,803,622 A | 2/1989 | Bain, Jr. et al. | |
| 4,975,883 A * | 12/1990 | Baker et al. ............. | 365/185.23 |
| 5,129,064 A | 7/1992 | Fogg, Jr. et al. | |
| 5,136,186 A * | 8/1992 | Trinh et al. ............... | 327/142 |
| 5,212,795 A | 5/1993 | Hendry | |
| 5,249,279 A | 9/1993 | Schmenk et al. | |
| 5,276,807 A | 1/1994 | Kodama et al. | |
| 5,301,151 A * | 4/1994 | Wells et al. ............. | 365/189.09 |
| 5,321,816 A | 6/1994 | Rogan et al. | |
| 5,347,638 A | 9/1994 | Desai et al. | |
| 5,367,647 A * | 11/1994 | Coulson et al. ........... | 710/105 |
| 5,371,709 A * | 12/1994 | Fisher et al. ............. | 365/226 |

(Continued)

FOREIGN PATENT DOCUMENTS

EP 0738978 10/1996

(Continued)

OTHER PUBLICATIONS

IEEE 100 The Authoritative Dictionary of IEEE Standards Terms, "nonvolatile random-access memory (NVRAM)", Dec. 2000, Standards Information Network IEEE Press, Seventh Edition, p. 743.*

(Continued)

*Primary Examiner*—Gabriel L. Chu
(74) *Attorney, Agent, or Firm*—Klein, O'Neill & Singh, LLP

(57) ABSTRACT

A system and method for minimizing memory corruption at power up and/or reset is provided. The system includes, a digitally controlled potentiometer between an adapter and the memory; and a voltage divider functionally coupled to the potentiometer. The voltage divider includes a pull-down resistor that brings down the voltage at one of the plural potentiometer pins, minimizing the chances of memory corruption at power up and/or reset. The method includes, setting the potentiometer to a resistance value such that upon power up and/or reset data cannot be written to the memory; and setting the potentiometer in an increment or decrement mode such that resistance between plural pins of the potentiometer can be increased or decreased allowing content to be written to the memory after power up and/or reset.

18 Claims, 4 Drawing Sheets

U.S. PATENT DOCUMENTS

| | | | |
|---|---|---|---|
| 5,371,861 A | 12/1994 | Keener et al. | |
| 5,420,798 A * | 5/1995 | Lin et al. | 702/64 |
| 5,448,702 A | 9/1995 | Garcia, Jr. et al. | |
| 5,568,614 A | 10/1996 | Mendelson | |
| 5,594,686 A * | 1/1997 | Hazen et al. | 365/185.04 |
| 5,671,365 A | 9/1997 | Binford et al. | |
| 5,740,467 A | 4/1998 | Chmielecki, Jr. et al. | |
| 5,742,935 A * | 4/1998 | Hazen et al. | 711/152 |
| 5,758,187 A | 5/1998 | Young | |
| 5,761,427 A | 6/1998 | Shah et al. | |
| 5,818,781 A * | 10/1998 | Estakhri et al. | 365/226 |
| 5,828,903 A | 10/1998 | Sethuram et al. | |
| 5,859,527 A * | 1/1999 | Cook | 323/298 |
| 5,875,343 A | 2/1999 | Binford et al. | |
| 5,881,296 A | 3/1999 | Williams et al. | |
| 5,892,969 A | 4/1999 | Young | |
| 5,905,905 A | 5/1999 | Dailey et al. | |
| 5,917,723 A | 6/1999 | Binford | |
| 5,968,143 A | 10/1999 | Chisholm et al. | |
| 5,983,292 A | 11/1999 | Nordstrom et al. | |
| 6,006,340 A | 12/1999 | O'Connell | |
| 6,049,802 A | 4/2000 | Waggener, Jr. et al. | |
| 6,055,603 A | 4/2000 | Ofer et al. | |
| 6,078,970 A | 6/2000 | Nordstrom et al. | |
| 6,085,277 A | 7/2000 | Nordstrom et al. | |
| 6,115,761 A | 9/2000 | Daniel et al. | |
| 6,138,176 A | 10/2000 | McDonald et al. | |
| 6,185,620 B1 | 2/2001 | Weber et al. | |
| 6,233,244 B1 | 5/2001 | Runaldue et al. | |
| 6,269,413 B1 | 7/2001 | Sherlock | |
| 6,434,630 B1 | 8/2002 | Micalizzi, Jr. et al. | |
| 6,457,090 B1 | 9/2002 | Young | |
| 6,463,032 B1 | 10/2002 | Lau et al. | |
| 6,502,189 B1 | 12/2002 | Westby | |
| 6,504,846 B1 | 1/2003 | Yu et al. | |
| 6,535,945 B1 * | 3/2003 | Tobin et al. | 710/305 |
| 6,546,010 B1 | 4/2003 | Merchant et al. | |
| 6,552,934 B2 * | 4/2003 | Roohparvar | 365/185.18 |
| 6,564,271 B2 | 5/2003 | Micalizzi, Jr. et al. | |
| 6,721,799 B1 | 4/2004 | Slivkoff | |
| 6,810,440 B2 | 10/2004 | Micalizzi, Jr. et al. | |
| 6,810,442 B1 | 10/2004 | Lin et al. | |
| 7,093,140 B2 * | 8/2006 | Hsu et al. | 713/300 |
| 2002/0104031 A1 * | 8/2002 | Tomlinson et al. | 713/320 |

FOREIGN PATENT DOCUMENTS

| | | |
|---|---|---|
| WO | WO 95/06286 | 3/1995 |
| WO | WO 00/58843 | 10/2000 |

OTHER PUBLICATIONS

Xicor, "Digitally Controlled Potentiometer (XDCP(TM))", Apr. 27, 2001, Xicor., pp. 1-3.*

* cited by examiner

METHOD AND SYSTEM FOR MINIMIZING MEMORY CORRUPTION

BACKGROUND

1. Field of the Invention

The present invention relates to host bus adapters, and more particularly, to minimizing corruption of memory used by host bus adapters.

2. Background of the Invention

A Host bus adapter (may also be referred to as "controller", "adapter" or "HBA") is an adapter placed between a host system computer bus and a network (fibre channel system, Ethernet, Gigabit Ethernet, or any other system). HBAs manage transfer of information between the host system and the network. To minimize the impact on host processor performance, HBAs perform various interface functions automatically or with minimal host processor involvement.

HBAs are connected to a host system via standard buses. One such bus is the Peripheral Component Interconnect ("PCI"), a standard bus developed by Intel Corporation®, incorporated herein by reference in its entirety. PCI is a 64-bit bus, though it is usually implemented as a 32-bit bus. It can run at clock speeds of 33 or 66 MHz. At 32 bits and 33 MHz, it yields a throughput rate of 133 MBps.

PCI-X is another standard bus that is backward compatible with existing PCI cards. The PCI-X standard is incorporated herein by reference in its entirety. PCI-X improves upon the speed of the PCI bus from 133 MBps to as much as 1 GBps. PCI-X was designed to increase performance of high bandwidth devices, such as Gigabit Ethernet and Fibre Channel.

Most HBAs are coupled to non-volatile random access memory ("NVRAM") that allows HBAs to move information from a host and to/from the network. The problem with conventional HBAs using NVRAM is that the NVRAM may be erased accidentally when the HBA is powered on.

Typically, NVRAM control inputs are driven by general-purpose input/out ("GPIO") pins from an HBA (or any other integrated circuit), which interfaces with a host system through a PCI backplane. At power up, and even sometimes during reset of the HBA, PCI backplanes drive noisy and non-deterministic waveforms on the RESET pin of the HBA. The GPIO pins can also drive unpredictable waveforms due to the PCI RESET behavior. One such waveform may issue an "ERASE" command to the NVRAM that erases NVRAM content.

As HBAs are being deployed in modern networks, with high bandwidth and performance requirements, such accidental erasure of information can be devastating to the overall performance of computing systems.

Therefore, what is needed is a method and system for preventing corruption of NVRAM information during power-up and/or reset.

SUMMARY OF THE INVENTION

In one aspect of the present invention, a system for minimizing memory (which includes NVRAM) corruption at power up and/or reset is provided. The system includes, a potentiometer/variable resistor between an adapter and the memory; and a voltage divider functionally coupled to the potentiometer. The voltage divider includes a pull-down resistor that brings down the voltage at one of the plural potentiometer pins, minimizing the chances of memory corruption.

The potentiometer is driven by signals from the adapter and is in increment/decrement mode upon power up and/or reset. The potentiometer includes a wiper, which is stepped by an input up/down signal from the adapter.

In another aspect of the present invention, a method for minimizing memory corruption at power up and/or reset is provided. The method includes, setting a potentiometer/variable resistor to a resistance value such that upon power up and/or reset data cannot be written to the memory; and setting the potentiometer in a decrement/increment mode such that resistance between plural pins of the potentiometer can be decreased/increased allowing content to be written to the memory after power up and/or reset.

In yet another aspect of the present invention, a circuit for minimizing memory corruption at power up and/or reset is provided. The circuit includes, means for setting a potentiometer/variable resistor to a resistance value such that upon power up and/or reset, data cannot be written to the memory; and means for setting the potentiometer in a decrement mode such that resistance between plural pins of the potentiometer can be decreased allowing content to be written to the memory after power up and/or reset.

In one aspect of the present invention, writing to NVRAM is disabled during power-up and/or reset. Thereafter, writing to NVRAM is enabled. This minimizes the chances of accidental erasure during power up and/or reset.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a system using HBAs will be described. The specific architecture and operation of the preferred embodiment will then be described with reference to the general architecture.

Figure 1:
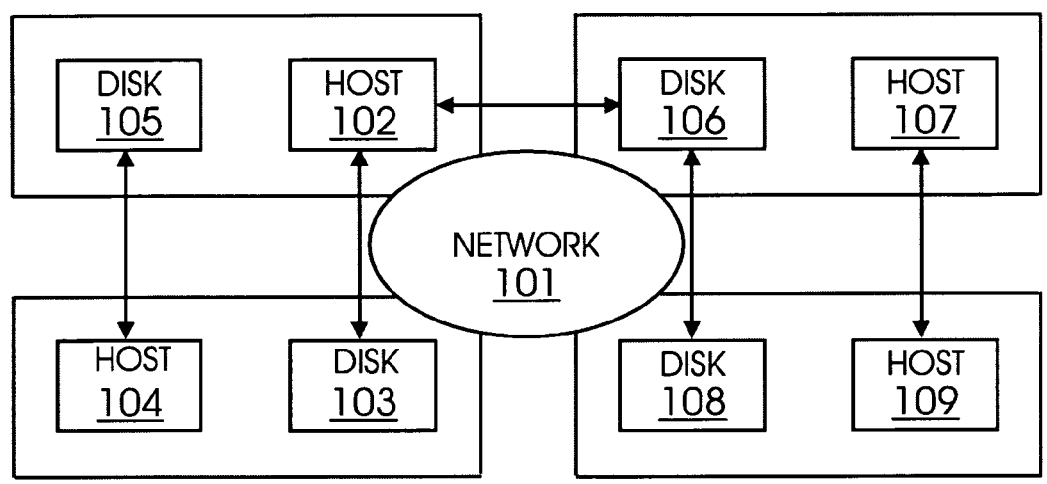
FIG. 1 shows a block diagram of a typical storage area network.

FIG. 1 shows a typical storage area network 100 with host systems 102, 104, 107 and 109 coupled to various disks 103, 105, 106 and 108 via network 101. Host system 104 (or others) are not described in detail, but it includes a central processing unit (CPU), a system memory (typically, random access memory "RAM"), read only memory (ROM) coupled to a system bus and a DMA controller unit. Host system 104 may be functionally coupled to an HBA using a PCI interface.

Figure 2A:
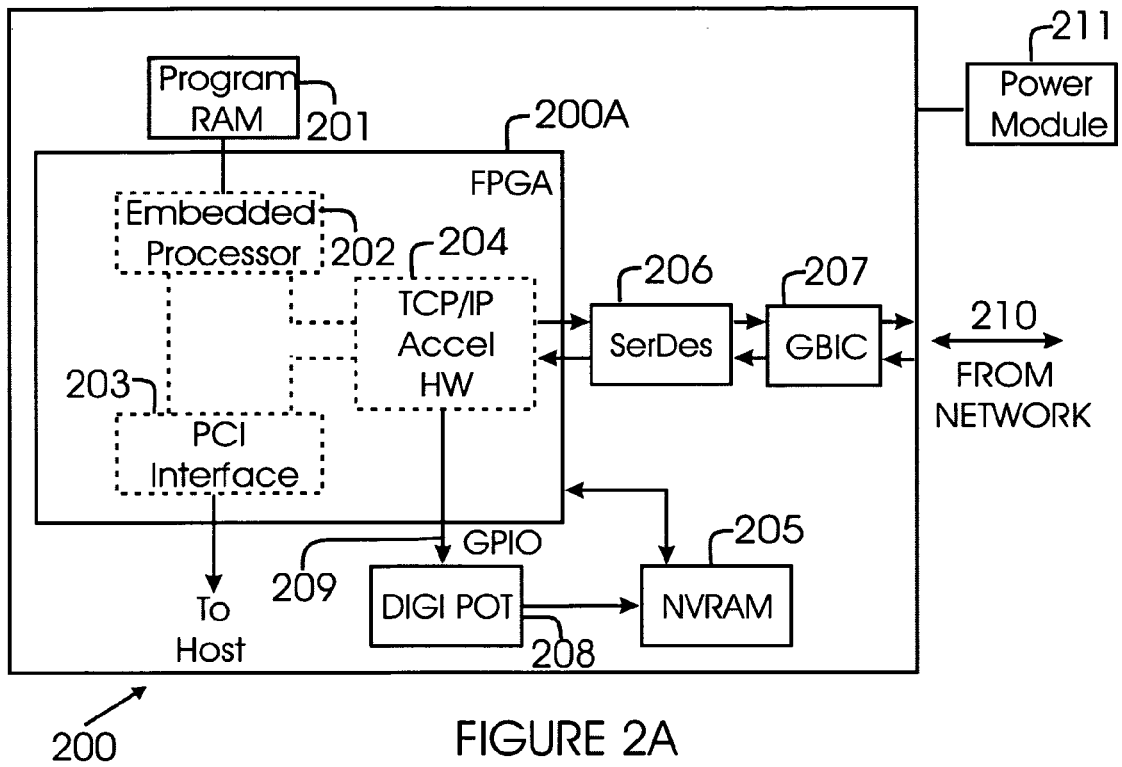
FIGS. 2A–2B show block diagrams of an HBA used according to one aspect of the present invention

FIG. 2A shows a top-level block diagram of system 200 using an adapter (or HBA) 200A on a field programmable array ("FPGA") board. Adapter 200A includes an embedded processor 202 (which may include more than one processor) and a TCP/IP accelerator 204 that implements the TCP/IP protocol in hardware for processing network packets 210 that are received by a gigabit interface converter ("GBIC") 207. GBIC 207 includes a transceiver for converting serial electric signals to serial optical signals and vice-versa. This is used to interface with a fiber optic/Ethernet system (Fibre Channel and Gigabit Ethernet systems).

Serial/de-serializer 206 serializes or de-serializes the signals before they enter (or leave) adapter 200A.

PCI interface 203 allows adapter 200A to interface with a host system (for example, host system 104).

Programmable random access memory ("RAM") 201 is provided to adapter 200A for executing firmware commands.

System 200A is coupled to NVRAM 205 via a digital potentiometer (also referred to herein as "digital pot") 208. NVRAM 205 may be a serial programmable read only, and write enabled memory. In this example, NVRAM 205 may be M93S66™ as sold by ST Micro™ or FM93CS66™ sold by Fairchild Semiconductor Corporation™. It is noteworthy that the adaptive aspects of the present invention are not limited to any particular type/model/size of NVRAM.

Digital pot 208 receives input via GPIO pins 209, according to one aspect of the present invention, as described in detail below. The term digital potentiometer as used throughout this specification means digitally controlled potentiometers that include variable resistors and traditional potentiometers. Various companies market digital potentiometers that can be configured both as a variable resistor or potentiometer. One such digital pot 208 is MAX5464, 50 k-ohm variable resister (sold as 32-Tap FleaPot™, 2 Wire Digital Potentiometer), marketed by Maxim Semiconductor®. Some other companies that market digital potentiometers are Microchip Corporation, Analog Devices Inc. and Xicor Inc. It is noteworthy that the adaptive aspects of the present invention are not limited to any particular brand or rating of digital pot 208.

System 200A is powered on by power module 211, which can be internal or external to system 200A. The adaptive aspects of the present invention are not limited to any particular power supply module.

Figure 2B:
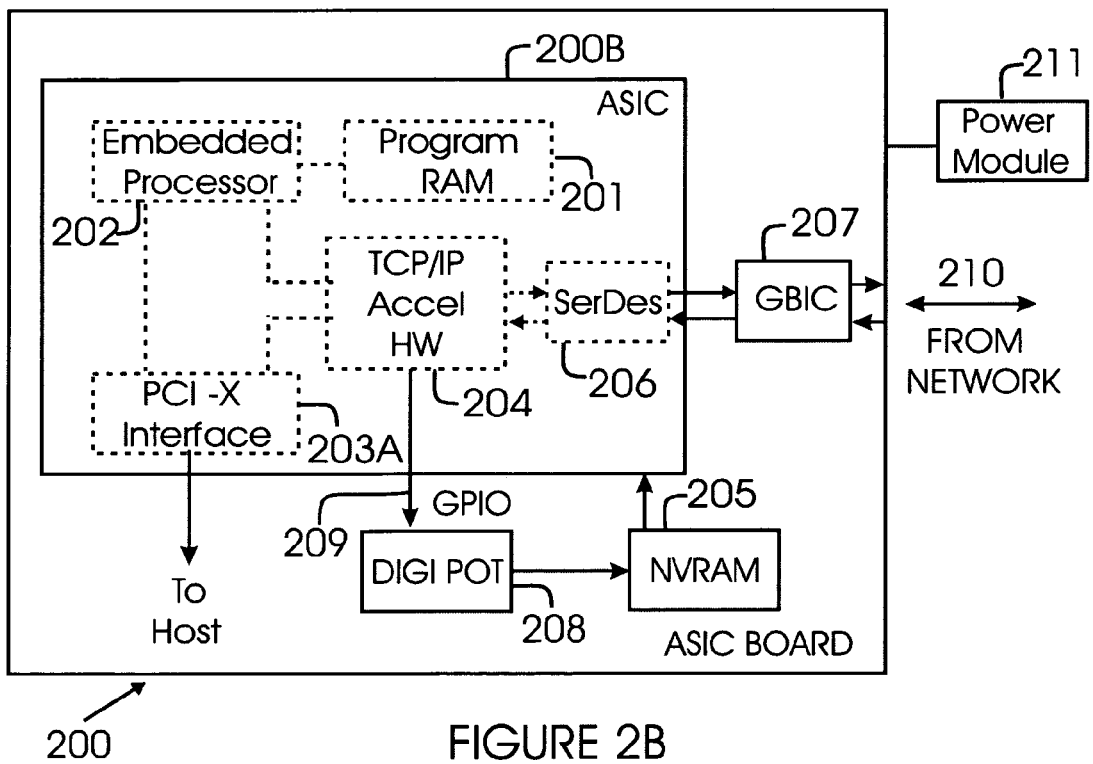

FIG. 2B shows an application specific integrated circuit ("ASIC") implementation of the system described above with respect to FIG. 2A. System 200B is similar to system 200A, except in this case it is an ASIC. System 200B is coupled to a host system via a PCI-X interface 203A. RAM 201 and SERDES 206 are on board (integrated in ASIC 200B). Most of the components in system 200B and 200A have the same functionality.

It is noteworthy that the foregoing systems are not intended to limit the present invention. Any adapter that uses an NVRAM or similar memory can use the various aspects of the present invention.

Figure 3:
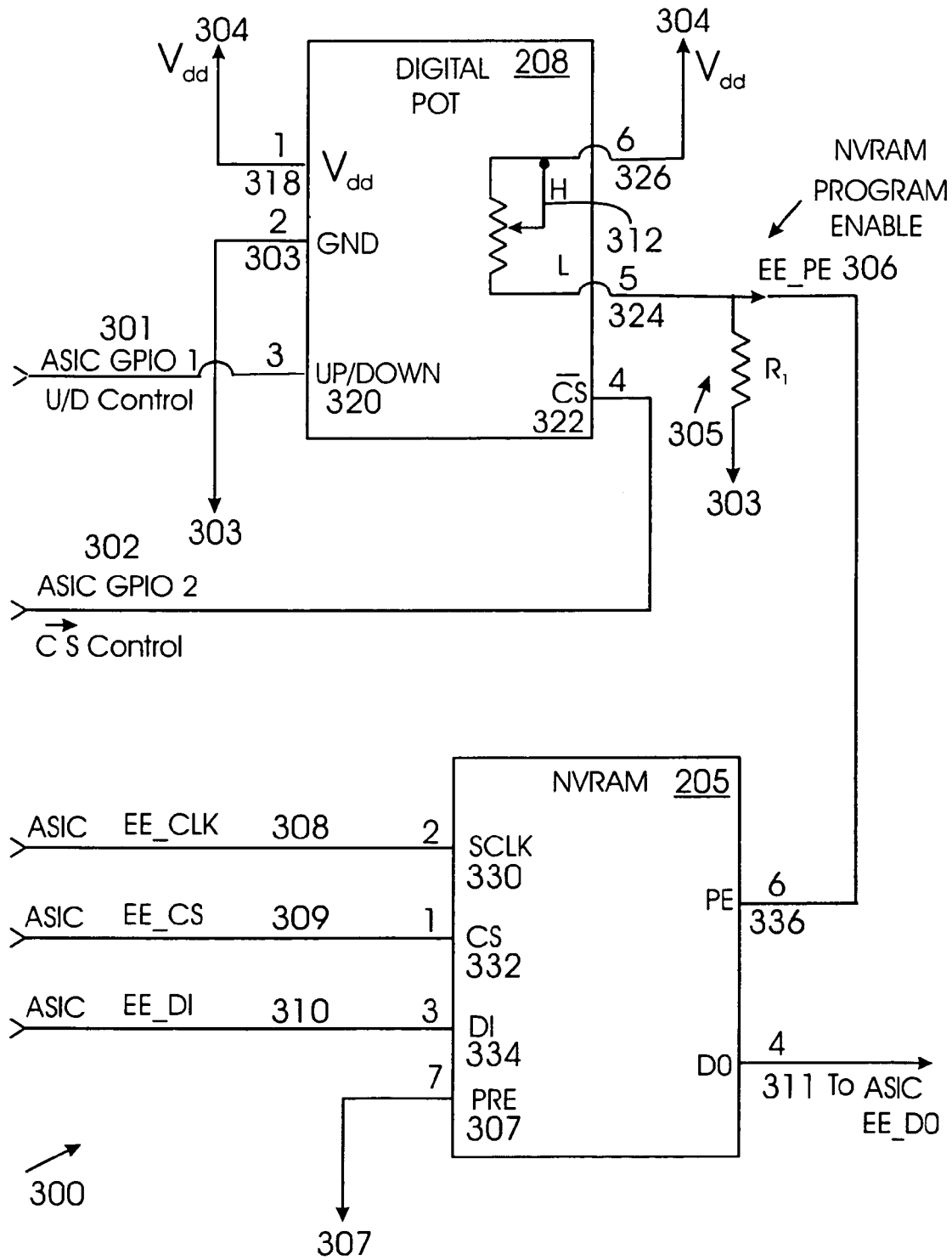
FIG. 3 shows a schematic to minimize NVRAM corruption, according to one aspect of the present invention.

FIG. 3 shows a circuit diagram of system 300, according to one aspect of the present invention, that prevents erasure of NVRAM 205 on power up and/or reset of system 200A and/or 200B. For illustration purposes, ASIC as referred herein with respect to FIG. 3, includes systems 200A and/or 200B.

Digital pot 208 receives various inputs from system 200B, including, input 301, which is used to control the up/down ("U/D") pin (320) (i.e. toggle pin 3 of digital pot 208). Another input 302 is used to control the chip select (also referred to as "CS") (pin 4 (322) of digital pot 208). Input 302 addresses digital pot 208 and enables resistance change, as described below.

Digital pot 208 receives input voltage at pin 1 (318) (Vdd 304) and is grounded at pin 2 (303). To illustrate one aspect of the present invention, Vdd may be 3.3V. It is noteworthy that the adaptive aspects of the present invention are not limited to any particular voltage at pin 6 (326) or pin 1 (318).

Resistor R1 305 acts as a "pull down" resistor forming a voltage divider with digital pot 208 pin L (324) (i.e. pin 5). To illustrate one aspect of the present invention, R1 305 may be 4.7K. It is noteworthy that the adaptive aspects of the present invention are not limited to any particular resistance value of R1 305.

NVRAM 205 receives signals 308–310 from system 200B. Signal 308 is a clock signal received at pin 2 (330), signal 309 is a chip select signal received at pin 1 (332) and signal 310 is a "data-in" signal received at pin 3 (334) that allows data content to be written in NVRAM 205. The foregoing signals allow system 200B to access NVRAM 205.

NVRAM receives signal 306 (EE_PE) at pin 6 (336) that enables system 200B firmware to write to NVRAM 205.

At power on of system 200B, digital pot 208 is set somewhere in the mid-point of its resistance range. In the foregoing illustration, that will be around 25K-ohm value, which will be the resistance between pin 6 (326) and 5 (324) of digital pot 208. At power up, R1 305 forms a voltage divider, and voltage at pin 5 (324) of digital pot 208 is given by:

Vdd*(R1/(R1+R2)), where R1 is resistor 305 and R2 is the resistance of the digital pot 208 at power up (in the foregoing example, 25 K-ohm). If Vdd is 3.3V and R1 305 is 4.7K-ohm, the voltage at pin 5 (324) of digital pot 208 is 0.16Vdd, i.e. 0.52V. This voltage or voltage similar to this is applied to pin 6 (323) of NVRAM 205. This disables the ability to write to NVRAM 205.

To enable writes, firmware running on system 200B drives GPIO pins (signals 301 and 302) to decrease the resistance between pins 5 (324) and 6 (326) of digital pot 208. Firmware commands digital pot 208 to change resistance a certain way (i.e. up or down) by driving signals 301 and 302. When signal 302 goes from high to low and signal 301 is low, decrement mode is selected enabling the resistance to decrease. When signal 302 goes from high to low and signal 301 is high, increment mode is selected enabling resistance to increase.

Digital pot 208 is set in an increment or decrement mode depending on whether it is configured as a potentiometer or a variable resistor.

Thereafter, pin 3 (320) is toggled, which steps wiper 312, changing the resistance between pins 5 (324) and 6 (326). The goal is to reach a certain voltage divider output, Y volts (for example, 0.7Vdd) to enable writes to NVRAM 205 after power up and/or reset.

Assume that the range of the digital pot at resistance R is N steps. Each resistance step is R/N. Therefore, it will take X number of toggles to reach to voltage Y. If R is 50K-ohm, and N is 32, then it will take 15 toggles to reach 0.7Vdd.

The chances of random toggling of ASIC 200B control pins to enable the decrement mode (or increment mode if digital pot 208 is configured as a potentiometer) of digital pot 208, then toggle the UP/DN pin (320) 15 times while remaining in decrement mode, is very small, and this minimizes the chances of NVRAM from getting corrupted at power up and/or reset.

Figure 4:
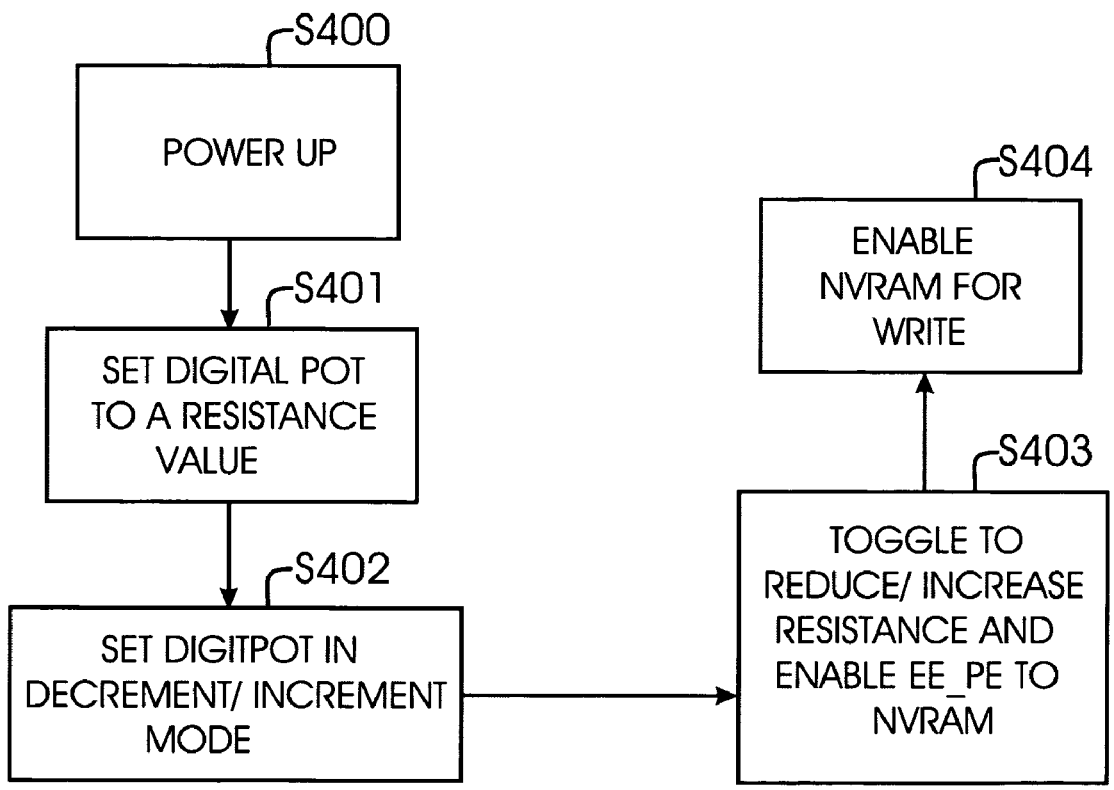
FIG. 4 is a flow diagram of executable process steps for minimizing NVRAM corruption, according to one aspect of the present invention.

FIG. 4 shows a flow diagram of executable process steps for preventing corruption of an NVRAM, according to one aspect of the present invention. Turning in detail to FIG. 4, in step S400, system 200B is powered up and/or reset.

In step S401, digital pot 208 is set to a certain resistance value. In the foregoing example, and in one aspect of the present invention, digital pot 208 is set around the mid-point of its resistance range.

In step S402, digital pot 208 is set in a decrement or increment mode. This is achieved by setting 301 low then bringing 302 from high to low (or when signal 302 goes from high to low and signal 301 is high for the increment mode).

In step S403, system 200B commands digital pot 208 to change the resistance between pins 5 (324) and 6 (326) by driving signals 301 and 302. To decrease the resistance, signal 301 is low and signal 302 is brought from high to low. Signal 301 is then toggled so that wiper 312 changes the resistance between pins 5 (324) and 6 (326).

In step S404, once the resistance between pins 5 (324) and 6 (326) is low, signal EE-PE 306 is enabled, which allows firmware of ASIC 200B to write to NVRAM 205, using signals 308–310.

In one aspect of the present invention, writing to NVRAM is disabled during power-up. Thereafter, writing to NVRAM is enabled. This minimizes the chances of accidental erasure during power up.

Although the present invention has been described with reference to specific embodiments, these embodiments are illustrative only and not limiting. Many other applications and embodiments of the present invention will be apparent in light of this disclosure and the following claims.

What is claimed is:

1. A system for minimizing memory corruption at power up and/or reset, comprising:
    a digitally controlled potentiometer between an adapter and the memory; and
    a voltage divider functionally coupled to the potentiometer.

2. The system of claim 1, wherein the voltage divider includes a pull-down resistor that brings down the voltage at one of the plural potentiometer pins, minimizing the chances of memory corruption at power up and/or reset.

3. The system of claim 1, wherein the potentiometer includes a wiper, which is stepped by an input up/down signal from the adapter.

4. The system of claim 1, wherein the memory includes non-volatile random access memory.

5. A method for minimizing memory corruption at power up and/or reset, comprising:
    setting a digitally controlled potentiometer to a resistance value such that upon power up and/or reset data cannot be written to the memory; and
    setting the potentiometer in an increment or decrement mode such that resistance between plural pins of the potentiometer can be decreased or increased allowing content to be written to the memory after power up and/or reset.

6. The method of claim 5, further comprising: enabling the memory for writing after toggling down the resistance between the plural potentiometer pins.

7. The method of claim 5, wherein an up/down signal from an adapter toggles the resistance between the plural pins.

8. The method of claim 5, wherein a voltage divider is functionally coupled to the potentiometer, such that upon power-up and/or reset, content cannot be written to the memory.

9. The method of claim 5, wherein the memory includes non-volatile random access memory.

10. A circuit for minimizing memory corruption at power up and/or reset, comprising:
    means for setting a digitally controlled potentiometer to a resistance value such that upon power up and/or reset data cannot be written to the memory; and
    means for setting the potentiometer in an increment or decrement mode based on how the digitally controlled potentiometer has been configured such that resistance between plural pins of the potentiometer can be decreased or increased allowing content to be written to the memory after power up and/or reset.

11. The circuit of claim 10, further comprising:
    means for enabling the memory for writing after toggling resistance between the plural potentiometer pins.

12. The circuit of claim 10, wherein an up/down signal from an adapter toggles the resistance between the plural pins.

13. The circuit of claim 10, wherein a voltage divider is functionally coupled to the potentiometer, such that upon power-up and/or reset content cannot be written to the memory.

14. The circuit of claim 10, wherein the memory includes non-volatile random access memory.

15. A system including a host bus adapter (HBA) coupled to a host system and a memory, comprising:
    a digitally controlled potentiometer between the HBA and the memory; and
    a voltage divider functionally coupled to the potentiometer wherein the voltage divider includes a pull-down resistor that brings down the voltage at one of the plural potentiometer pins, minimizing the chances of memory corruption.

16. The system of claim 15, wherein the potentiometer is driven by signals from the adapter and is in increment or decrement mode upon power up and/or reset.

17. The system of claim 15, wherein the potentiometer includes a wiper, which is stepped by an input up/down signal from the adapter.

18. The system of claim 15, wherein the memory includes non-volatile random access memory.

* * * * *